United States Patent [19]

Hoffmann

[11] 4,394,243
[45] Jul. 19, 1983

[54] ELECTRODE FOR AN ELECTROCHEMICAL METAL MACHINE PROCESS

[75] Inventor: Gerhard Hoffmann, Berglen-Steinach, Fed. Rep. of Germany

[73] Assignee: Daimler-Benz Aktiengesellschaft, Stuttgart, Fed. Rep. of Germany

[21] Appl. No.: 188,742

[22] Filed: Sep. 19, 1980

[30] Foreign Application Priority Data

Sep. 22, 1979 [DE] Fed. Rep. of Germany ....... 2938402

[51] Int. Cl.³ .................. C25B 11/03; B23P 1/02; C25F 7/00
[52] U.S. Cl. ................... 204/284; 204/288; 204/297 R
[58] Field of Search .............. 204/224 M, 225, 280, 204/284, 288, 289, 297 R

[56] References Cited

U.S. PATENT DOCUMENTS

| 1,467,083 | 9/1923 | Bart ..................................... 204/284 |
| 3,458,424 | 7/1969 | Bender ............................. 204/289 X |
| 3,467,593 | 9/1969 | Dickson et al. ................. 204/224 M |
| 3,472,754 | 10/1969 | Williams ......................... 204/288 X |
| 3,514,390 | 5/1970 | Stark et al. .......................... 204/284 |
| 3,990,959 | 11/1976 | Payne et al. ............... 204/224 M X |

FOREIGN PATENT DOCUMENTS

2034753  6/1980  United Kingdom ........... 204/224 M

*Primary Examiner*—Donald R. Valentine
*Attorney, Agent, or Firm*—Craig & Burns

[57] ABSTRACT

An electrode for an electrochemical metal removing process, with the electrode consisting of a metal sheet extending at right angles to a sinking direction of the electrode. To enable the production of end face contours the metal sheet is provided with perforations which extend laterally beyond an edge of the workpiece being processed. A resiliently mounted plate of an insulating material may be provided for covering a rear side of the perforations.

9 Claims, 4 Drawing Figures

ELECTRODE FOR AN ELECTROCHEMICAL METAL MACHINE PROCESS

The present invention relates to an electrode and, more particularly, to a cathode for an electrochemical metal machining process (ECM) process, especially for a production of face contours with closely juxtaposed teeth having parallel and vertical lateral surfaces.

For many years the electrochemical metal machining process has found wide use and various manufacturing firms have offered numerous types of apparatus for the electrolytic process. In this connection, it is generally customary to fashion the cathode as the workpiece negative and to machine appropriate contours into the workpiece with the aid of the negative mold. However, with such an approach, if an attempt is made to produce a profile having parallel and vertical lateral surfaces, such approach meets with failure because during electrolysis it is not only the end face of the cathode which effects the desired removal but also the lateral faces become effective whereby a considerable distortion of the desired profile is produced.

While one possibility for avoiding the profile distortion lies in providing an insulation of the lateral faces by, for example, embedding such lateral faces with a synthetic resin material, this possibility results in extraordinarily high expenses and is, as a practical matter, no longer feasible in situations when the cathodes have a plurality of closely juxtaposed teeth.

The aim underlying the present invention essentially resides in providing a cathode for an electrochemical metal machining process which permits an inexpensive production of profiles having parallel and vertical sidewalls.

In accordance with advantageous features of the present invention, a cathode for an electrochemical metal removing process is proposed which includes a metal sheet extending at right angles to a sinking or immersion direction.

Advantageously, in accordance with further features of the present invention, the sheet metal for a production of end face contours is provided with perforations which extend laterally beyond the workpiece.

Advantageously, the perforations may be covered on a rear side with a resiliently mounted plate of an insulating material.

By virtue of the construction of a cathode in accordance with the present invention, such cathode no longer consists of a negative image of the form desired for the workpiece but rather the cathode is quasi two-dimensionally limited to the electrode surface required for the shaping step. Consequently, to produce an end face tooth unit with vertical tooth flanks, the cathode of the present invention consists of a metal sheet provided with perforations wherein the perforations correspond to the shape of the teeth being manufactured.

If, for example, the teeth of the workpiece are to extend over an entire end face as, for example, in the case of a toothed rim, it is especially advantageous if the perforations extend laterally beyond the workpiece because in this case no shoulder is formed due to the erosion between the inner and outer edges of the tooth and between the inner and outer edges of the diameter.

A removal of tooth crowns takes place with the cathode of the present invention to only a minimum extent; however, it can be entirely avoided if the perforations are covered on a rear side thereof with a resiliently mounted plate of an insulating material. Upon a sinking or lowering of the electrode into the workpiece, the plate of insulating material closely contacts an end face of the thus forming teeth at a location to suppress any attacks so that at that point the tolerances and surface structure which are present prior to the immersing are preserved.

In accordance with the present invention, the sheet metal thickness should be selected, on the one hand, to be minimal to keep an attack on the flank of the profile as small as possible; however, on the other hand, it is also necessary to provide a sheet metal thickness which insures a sufficient lifetime and mechanical stability. Therefore, according to the present invention, the thicknesses of a foil-type of up to 0.5 mm will generally be sufficient depending upon the properties of the metal sheet and the required profile reproducing accuracy. When employing sheets of a foil thickness, it is frequently suitable to mechanically stabilize a foil by clamping the same into an appropriate electrode holder.

Electrodes having a sheet metal thickness of 0.1 to 0.3 mm are especially advantageous with respect to the reproduction accuracy and lifetime of the electrode in addition to being particularly simple to manufacture. The desired electrode shape may be obtained in an especially simple manner by cutting, punching, or etching, since it is not necessary to abrade large amounts of material. Moreover, a reworking of the electrode, which may be required for adapting the electrode to the process conditions of the ECM method, for example, adaption of a required gap width to given workpiece dimensions, is especially simple with the use of the electrodes of the present invention and may be readily accomplished by, for example, etching.

The operating conditions which are necessary for conducting or carrying out the ECM process may be determined by, for example, test sinkings or lowerings, empirically, or with the aid of other conventional methods such as disclosed, for example, in Auslegungsschrift No. 20 30 657 or Offenlegungsschrift No. 15 40 773. In order to perform or carry out the ECM process, advantageously, the electrode is expediently clamped into a suitable electrode holder from which it can be readily removed and exchanged.

As can readily be appreciated, several advantages are attained with the electrode of the present invention. More particularly, since the electrode is made of a thin sheet metal, manufacture and working of the electrode are extremely simple. Moreover, due to a low consumption of material, it is also possible to use relatively expensive electrode materials. Additionally, since the manufacture of the electrode is relatively inexpensive, the electrode may be changed during use even in situations wherein they are only relatively minor deviations from manufacturing dimensions so that workpieces may be produced with especially narrow tolerances.

Furthermore, the reproducibility of a dimension is excellent in the electrode of the present invention due to a stable gap formation during sinking or lowering and is based on the fact that, in contrast to conventional electrodes, the effective electrode surfaces always remain the same. Thus, for example, it is possible to reproduce with an electrode having a thickness of 0.25 mm, a dimension with an accuracy of 0.02 mm.

Accordingly, it is an object of the present invention to provide an electrode for an electrochemical machine process which avoids, by simple means, shortcomings and disadvantages encountered in the prior art.

Another object of the present invention resides in providing an electrode for an electrochemical metal machining process which permits the efficient production of profiles having parallel and vertical sidewalls.

In another object of the present invention resides in providing an electrode for an electrochemical metal machining process which is mechanically stable and has a relatively long lifetime.

A further object of the present invention resides in providing an electrode for electrochemical machining process which maximizes the accuracy of reproduction of the desired profile.

A still further object of the present invention resides in providing an electrode for an electrochemical metal machining process which minimizes distortion of the desired profile to be produced.

Another object of the present invention resides in providing an electrode for an electrochemical metal machining process which enables the production of an element having a plurality of closely juxtaposed teeth.

These and other objects, features, and advantages of the present invention will become more apparent from the following description when taken in connection with the accompanying drawings which, show, for the purpose of illustration only, several embodiments in accordance with the present invention and, wherein.

Figure 1:
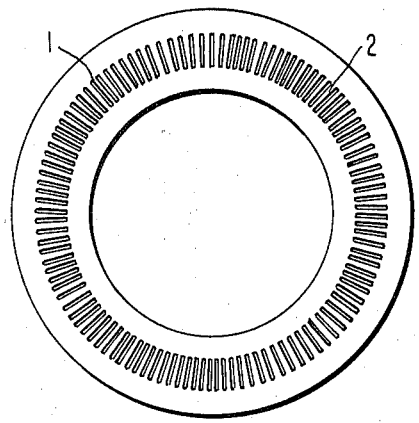
FIG. 1 is a top view of a sheet metal electrode for producing a face profile in accordance with a first embodiment of the present invention.

Referring now to the drawings wherein like reference numerals are used throughout the various views to designate like parts and, more particularly, to FIG. 1, according to this Figure, an electrode forming a cathode is fashioned as a sheet metal ring for producing a round face profile. The sheet metal ring is provided with recesses 1 removed from the ring by etching or punching. As a result of the provision of the recesses, ridges 2 are formed between the recesses with the ridges 2 as well as the other remaining sheet metal surfaces which are left standing are effective for a removal step during the processing of a workpiece.

Figure 2:
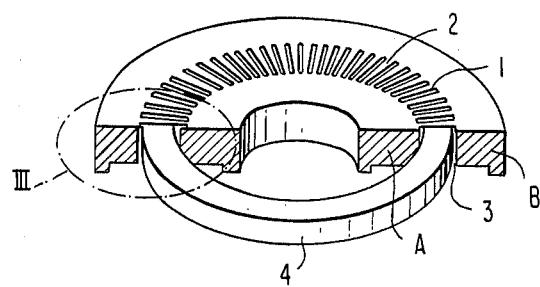
FIG. 2 is a partial cross-sectional view of another embodiment of an electrode in accordance with the present invention.

FIG. 2 provides a partial sectional view through another electrode wherein an annular groove is lathed into a solid piece until the remaining material had a sheet metal thickness of about 0.3 mm. From this annular groove 3, the desired profile of ridges 2 and recesses or perforations 1 may be produced by etching or electrospark sinking. An insulating synthetic resin ring 4 is resiliently attached behind the perforations or recesses 1. To form the workpiece into, for example, a gear or the like, the synthetic resin ring 4 is urged against a crown of the teeth forming during a sinking of the electrode and shield teeth against any attack by an electrolytic solution. Springs (not shown) are provided for effecting the necessary contact pressure of the insulating ring 4 against the electrode.

Advantageously, the insulating synthetic resin ring 4 may consist of any materials which have an electrical insulating power and which are inert to the electrolytic solution under sinking or immersion conditions. The materials may, for example, be polyolefins such as polyethylene, a polyvinyl chloride, polystyrene, rubber, and other similar materials. As readily appreciated, instead of machining the annular groove 3 in a solid piece, it is also possible to produce the electrode of FIG. 2 by soldering or threadably connecting an electrode such as shown in FIG. 1 to two solid turned parts A, B.

Figure 3:
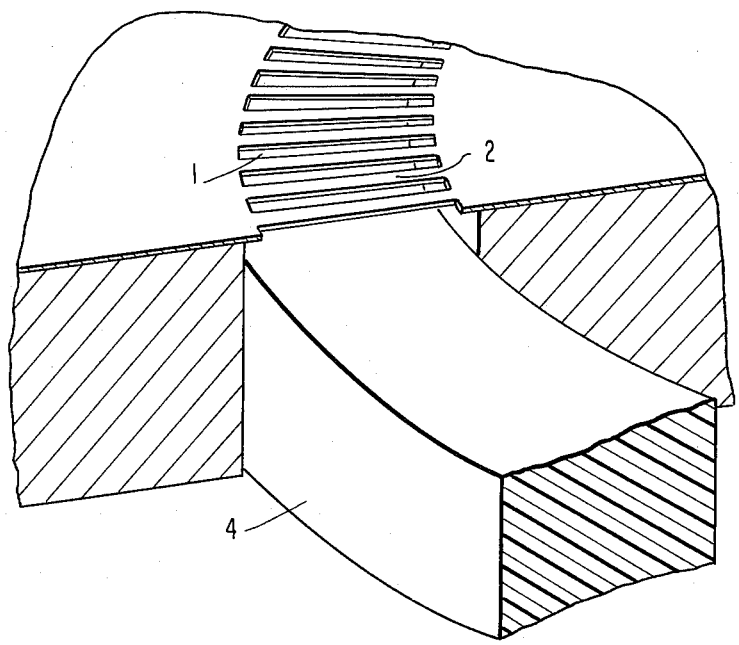
FIG. 3 is a fragmentary view of the electrode of FIG. 2 at a location designated III.

The arrangement of the ridges 2 and the recesses or perforations 1 becomes especially clear from the fragmentary view of FIG. 3. In FIG. 3, the insulating synthetic resin ring 4 is illustrated in a slightly lifted position.

Figure 4:
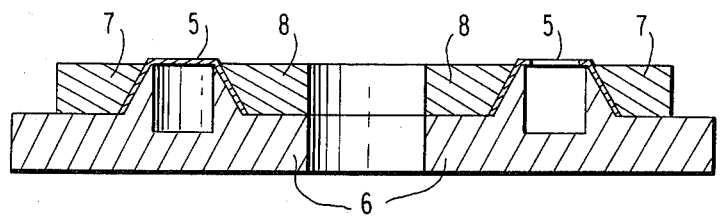
FIG. 4 is cross-sectional view through an electrode similar to FIG. 1 installed in an electrode holder.

FIG. 4 provides an example of a cross-sectional view through a circular electrode 5 installed in an electrode holder and, according to this figure, the electrode holder includes a baseplate 6 to which the electrode is fastened between outer and inner clamping members 7, 8, respectively. Conically turned portions project from the baseplate 6 and serve for clamping the electrode in place; however, such conically turned portions may be omitted if the electrodes have a sufficient wall thickness.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. An electrode for an electrochemical metal-removing process for a workpiece having an edge, characterized in that the electrode is formed of a metal sheet which extends at right angles to a direction of sinking of the electrode in the metal removing process, the metal sheet is provided with perforations adapted to extend laterally beyond a line defined by said edge to be processed so as to enable the production of end-faced contours, means disposed against the metal sheet on the side thereof leading in the direction of sinking for insulating a surface coextensive with said perforations to prevent electrochemical metal removal therefrom.

2. An electrode for an electrochemical metal-removing process for a workpiece having an edge, characterized in that the electrode is formed of a metal sheet which extends at right angles to a direction of sinking of the electrode in the metal-removing process, an electrode holder is provided which includes a base plate for accommodating the electrode, and in that inner and outer clamping members are provided for fastening the electrodes to the electrode holder, and means disposed against the metal sheet on the side thereof leading in the direction of sinking for insulating a surface coextensive with said perforations to prevent electrochemical metal removal therefrom.

3. An electrode for an electrochemical metal-removing process, characterized in that the electrode is formed of a metal sheet which extends at right angles to a direction of sinking of the electrode in the metal-removing process, an electrode holder is provided with includes a base plate for accommodating the electrode, inner and outer clamping members are provided for fastening the electrodes to the electrode holder, and in that the base plate is provided with conically turned portions for ensuring a clamping of the electrode in place.

4. An electrode for an electrochemical metal-removing process for a workpiece having an edge, characterized in that the electrode is formed of a metal sheet which extends at right angles to a direction of sinking of the electrode in the metal-removing process, and in that the metal sheet has a thickness of 0.1–0.5 mm, and
   means disposed against the metal sheet on the side thereof leading in the direction of sinking for insulating a surface coextensive with said perforations to prevent electrochemical metal removal therefrom.

5. An apparatus for an electrochemical metal-removing process for a workpiece having an edge comprising:
   means for producing in the workpiece end-faced contours, the surfaces of the contours being perpendicular to a predetermined plane comprising
   an electrode formed of a metal sheet extending in said plane perpendicular to a direction of sinking of the electrode during the metal removing process, the metal sheet is provided with perforations extending laterally adjacent a line defined by said edge processed, and
   means disposed aginst the metal sheet on the side thereof leading in the direction of sinking for insulating a surface coextensive with said perforations to prevent electrochemical metal removal therefrom.

6. A cathode for an electrochemical metal removing process consisting of a sheet which extends perpendicular to the direction of sinking, characterized by the fact that the sheet for manufacturing workpiece end contours is equipped with penetrations which are covered in the rear with a spring-mounted plate of insulating material.

7. A cathode in accordance with claim 6, characterized by the fact that the penetrations extend sideways over the workpiece.

8. An apparatus for an electrochemical metal-removing process for a workpiece having an edge comprising:
   means for producing in the workpiece end-faced contours, the surfaces of the contours being perpendicular to a predetermined plane comprising
   an electrode formed of a metal sheet extending in said plane perpendicular to a direction of sinking of the electrode during the metal removing process, wherein the metal sheet is provided with perforations extending beyond a line defined by said edge processed in a direction perpendicular to the direction of sinking, and
   means for insulating a surface coextensive with said perforations to prevent electrochemical metal-removal therefrom.

9. An apparatus as set forth in claim 8, wherein said means for insulating is urged against said surface parallel to the predetermined plane.

* * * * *